United States Patent
Lawrence et al.

(10) Patent No.: US 7,833,610 B2
(45) Date of Patent: Nov. 16, 2010

(54) IRIDESCENT MATERIALS AND DEVICES

(75) Inventors: Christopher Robert Lawrence, Farnborough (GB); Peter Vukusic, Exeter (GB); John Roy Sambles, Exeter (GB)

(73) Assignee: Qinetiq Limited (GB)

( * ) Notice: Subject to any disclaimer, the term of this patent is extended or adjusted under 35 U.S.C. 154(b) by 1429 days.

(21) Appl. No.: 10/399,797

(22) PCT Filed: Sep. 3, 2001

(86) PCT No.: PCT/GB01/03947

§ 371 (c)(1),
(2), (4) Date: Apr. 22, 2003

(87) PCT Pub. No.: WO02/35262

PCT Pub. Date: May 2, 2002

(65) Prior Publication Data

US 2004/0101638 A1    May 27, 2004

(30) Foreign Application Priority Data

Oct. 28, 2000    (GB) ................................. 0026469.7

(51) Int. Cl.
*B41M 5/00* (2006.01)
*B44C 1/17* (2006.01)
*G03G 7/00* (2006.01)

(52) U.S. Cl. .................... 428/195.1; 428/198; 428/220; 428/913; 428/913.3

(58) Field of Classification Search ............. 428/195.1, 428/913, 198, 220, 913.3
See application file for complete search history.

(56) References Cited

U.S. PATENT DOCUMENTS

| 467,661 | A |   | 1/1892 | Jacobson |
|---|---|---|---|---|
| 4,501,439 | A | * | 2/1985 | Antes .......................... 283/91 |
| 4,958,892 | A |   | 9/1990 | Jannson et al. |
| 5,116,461 | A |   | 5/1992 | Lebby et al. |
| 5,234,729 | A |   | 8/1993 | Wheatley et al. |
| 5,640,255 | A |   | 6/1997 | Haines |

FOREIGN PATENT DOCUMENTS

EP    0 442 206    8/1991

OTHER PUBLICATIONS

Kogelnik H., "Coupled Wave Theory for Thick Hologram Gratings", Bell System Technical Journal, pp. 2902-2947 (1969).

* cited by examiner

*Primary Examiner*—Betelhem Shewareged
(74) *Attorney, Agent, or Firm*—McDonnell Boehnen Hulbert & Berghoff LLP

(57) ABSTRACT

An iridescent material comprises a diffraction grating incorporating a plurality of sheets (1) of a first substantially transparent material in parallel alignment and spaced away apart by quantities of a second substantially transparent material (2), the second material having a refractive index significantly lower than the refractive index of the first material, the plates being tilted at an angle θ to an axis X and the grating having a period d(X) in the direction of axis X, the angle θ and period d being such that a second diffraction grating is provided along an axis Z, perpendicular to axis X, the second diffraction grating having a period d(Z) and consisting of ten periods or less and whereby, the diffraction conditions of the grating can be simultaneously fulfilled by electromagentic radiation of a range of wavelength thereby causing iridescence. Materials according to the invention have applications in inter alia document security, anti-counterfeiting measures, artwork, gift wrapping paper and cards and clothing design.

10 Claims, 5 Drawing Sheets

IRIDESCENT MATERIALS AND DEVICES

This invention relates to iridescent materials and in particular, multi-layer iridescent materials exhibiting angle-controlled iridescence.

Iridescent materials are known for the attractive colour changing properties they exhibit in different lights and at different grazing angles.

The present invention aims to provide iridescent materials of novel structure which can be adapted for use in a variety of applications including document security, decorative packaging, advertising logos, textile fibres and the like.

In accordance with the present invention there is provided an iridescent material comprising a diffraction grating incorporating a plurality of sheets of a first substantially transparent material in parallel alignment and spaced apart by quantities of a second substantially transparent material, the second material having a refractive index significantly lower than the refractive index of the first material, the plates being tilted at an angle θ to an axis X and the grating having a period d (X) in the direction of axis X, the angle θ and period d (X) being such that a second diffraction grating is provided along an axis Z, perpendicular to axis X, the second diffraction grating having a period d (Z) and consisting of twenty five periods or less and whereby, the diffraction conditions of the second diffraction grating can be simultaneously fulfilled by waveforms of a range of wavelengths thereby causing iridescence.

Preferably, the waveforms are electromagnetic and have a range of wavelengths between about $10^{-1}$ m and $10^{-8}$. More preferably $10^{-3}$ m and $10^{-4}$ m and most preferably $10^{-6}$ m and $10^{-7}$ m.

Suitable options for the first material include, but are not limited to, transparent polymeric materials and glasses having refractive indices in the region of 1.5. Other transparent materials having refractive indices of a similar order will no doubt occur to the skilled addressee and are not beyond the scope of the invention. It is to be understood that the refractive indices of the first and second materials are not essential to the invention, provided that the ratio of the refractive index of the first material to that of the second material is greater than 1 and preferably close to, or greater than, about 1.5.

Optionally, the second material is air, alternatively, the first and second materials are each provided in sheet form and are interleaved to form a multilayer structure.

These multi-layer structures may be obtained using a variety of methods including, but not limited to, stereolithographic techniques, micro-machining or holographic techniques.

Preferably, the second diffraction grating consists of fifteen periods or less, most preferably between 5 and 9 periods. A preferred embodiment consists of 7 periods.

Preferably d is in the order of $10^{-1}$ to $10^{-8}$ m in size, more preferably $10^{-3}$ m and $10^{-8}$ m, and where visible light is to be caused to iridescent, is in the order of $10^{-6}$ m and $10^{-7}$ m, most preferably between about 400 nm and 770 nm.

In another aspect, the invention provides an iridescent device comprising a plurality of alternating substantially planar layers of two substantially transparent materials having different refractive indices, a surface at least part of which is inclined to the normal to the planes of the layers, the thickness of the device being such that a line drawn through the device perpendicular to said part of the surface interacts no more than 25 of said alternating layers, whereby said part of the surface is capable of displaying an iridescent effect.

Devices in accordance with this aspect may cause iridescence of various waveforms, including electromagnetic waves. Optionally one of the transparent materials is air. Either or both of the transparent materials may comprise polymeric materials and/or glasses. For certain applications, where the thickness of the planar layers are to be provided on a microscopic scale, some methods for making such devices include, but are not limited to, stereolithographic techniques, micro-machining or holographic techniques.

In a third aspect, the invention provides a document security device comprising one or more of the novel iridescent materials applied to the whole or part of a surface of the document. In this aspect the document may, for example, be a private or confidential letter or report, alternatively, the document may be a bankers card or other identification card, the iridescent materials providing a counterfeit proof identifier for the card. In another alternative, the document may be a bank note.

Optionally, the document security device of the invention may comprise a plurality of iridescent materials arranged to form a pattern, each iridescent material causing iridescence at a different grazing angle and/or for waveforms of different wavelengths. Preferably, the wavelengths of radiation caused to iridescent are electromagnetic and in the range $10^{-3}$ m to $10^{-8}$ m.

In a fourth aspect, the invention provides a decorative material comprising a surface layer incorporating one or more of the novel iridescent materials. The decorative materials may, for example, include wrapping papers, card, fabrics for clothing manufacture and the like. Optionally, the decorative material may be provided in the form of fibres which may then be woven into fabrics. In this aspect, the waveforms caused to iridescent are preferably electromagnetic with wavelengths in the range $10^{-6}$ m to $10^{-7}$ m, i.e., visible light.

Optionally, the surface layer may comprise a plurality of the novel iridescent materials arranged to form a pattern, each iridescent material causing iridescence at a different grazing angle and/or for different wavelengths of visible light.

It has been found that iridescent materials according to the first aspect of the invention produce complex diffractive behaviour giving rise to angle controlled iridescence. These materials can be designed to produce surfaces which exhibit iridescence only at near grazing angles. By placing the iridescent materials on suitable substrates, articles can be provided which absorb waveforms at angles which do not produce iridescence thereby resulting in high contrast iridescent properties.

In any of the above embodiments of the invention, where the waveform is electromagnetic, the iridescent material may comprise a pigmented substrate. In such embodiments, the material may exhibit the colour or pattern of the substrate except where conditions for iridescence are met The conditions of iridescence may be applied to the material, say, to check for authenticity of the document carrying the material.

The invention will now be further described by way of example with reference to the following Figures in which.

Figure 1:
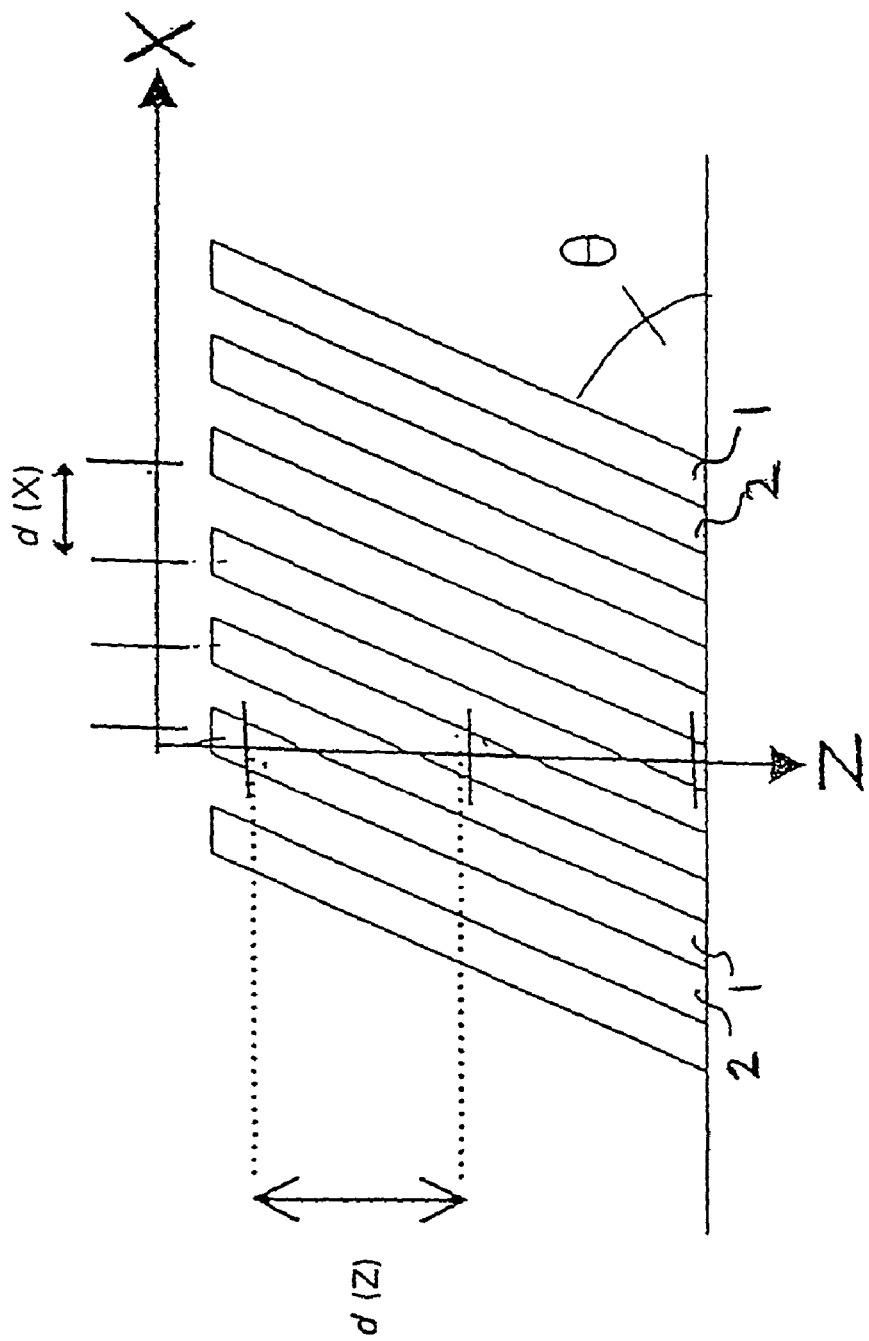
FIG. 1 shows a section through the diffraction grating portion of an iridescent material according to the present invention.

FIG. 1 shows a series of transparent plates 1 of high refractive index regularly arranged in parallel in a tilted stack at an angle θ to an axis X. The period of the grating d (X) along axis X is defined by the distance between the plates 1. Perpendicular to axis X is a second axis, Z. The period of the grating d (Z) along axis Z is defined by the distance between points where the Z axis passes through adjacent plates 1. Thus it can be seen that the number of periods on the Z axis is limited both by the width of the plates 1 and the angle θ.

Figure 4A:
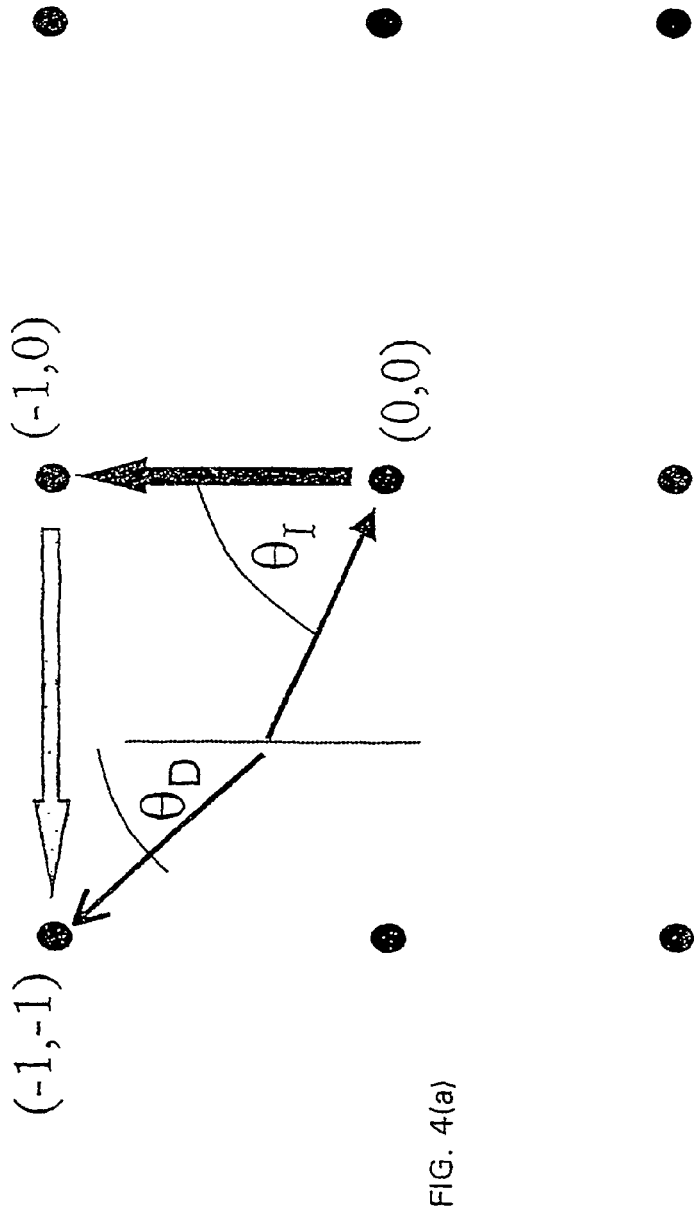
FIG. 4a and 4b show momentum vectors for photons incident on and diffracted from the diffraction gratings of FIG. 2.
Figure 4B:
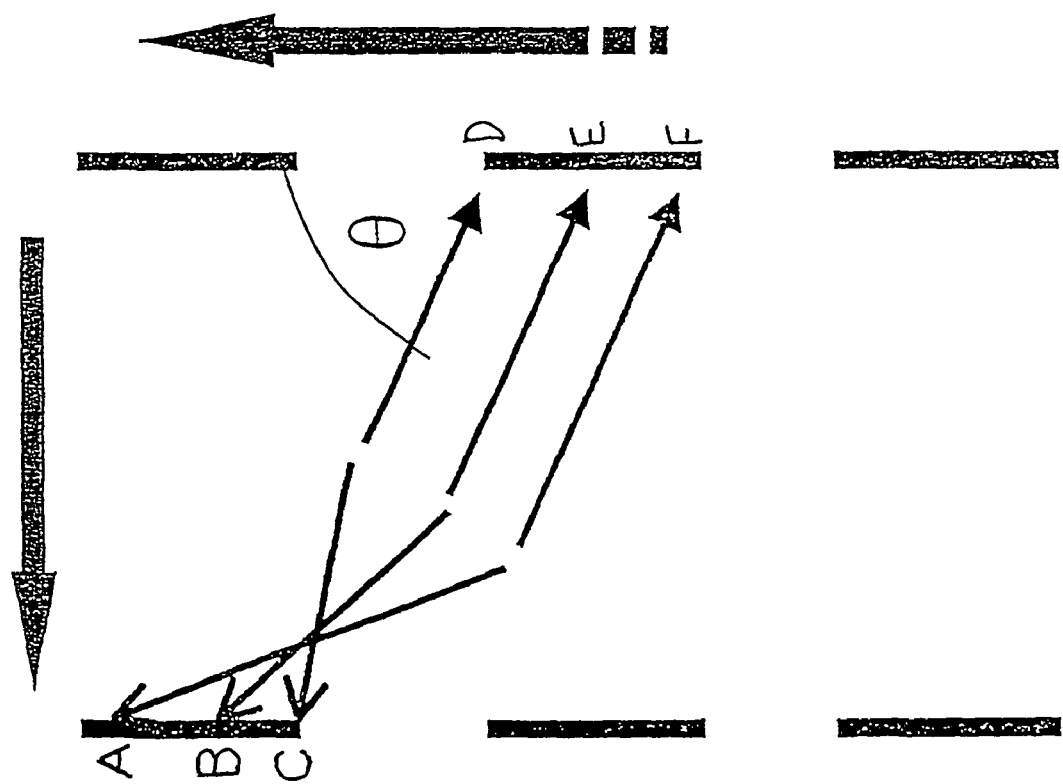

The gratings in both the X and Z axis are able to interact, simultaneously diffracting incident light in each axis. This behaviour can be modelled and predicted (as illustrated in FIG. 4(*a*)) by considering a lattice of discreet points in momentum space. Each point represents the termination point of a momentum vector that can be applied to an incident photon when it has been diffracted from either axis. Since photon momentum must be conserved, the incident and refracted photon momentum vectors must join two points on the lattice. Hence, lines connecting these points define photon momentum vectors which are possible solutions to the diffraction equations for the two gratings. Thus it can be deduced that for a photon diffracted from both gratings, there is only one possible photon momentum value which solves both equations. For a given angle of incidence, the photon momentum value is $k_{ph}=2\pi/\lambda_{ph}$, where $\lambda_{ph}$ is the photon wavelength.

As will be understood by the skilled addressee, diffraction gratings are resonant structures whose properties result from the interaction of their diffractive elements, the less diffractive elements there are, the less easily are the conditions for resonance defined. The inventors have found that, where a grating consists of fewer than ten periods, the behaviour of the grating begins to change.

In terms of the momentum space diagram (FIG. 4(*a*)), the effect of limiting the number of diffracting elements (or periods d(Z)) in the grating is a broadening of the discreet points into lines as shown in FIG. 4(*b*). These lines may be joined by a variety of routes, for example, centre-to-centre (B-to-E) reproducing the vector for the infinite grating case shown in FIG. 4(*a*), or by routes such as A-to-F or C-to-D. Thus it can be seen that for the angle of incidence, different value photon momentum vectors ($k_{ph}$) can be defined. The visible result is that photons of several different wavelengths (as may commonly be found in visible light) can strike the iridescent material of the invention at the same angle and each will be diffracted at a different angle from the others. This results in a variably coloured hue returning from the material which is perceived by a viewer as iridescence.

The extent to which this iridescent effect is achieved is defined in terms of the scattering intensity of the structure which is proportional to Φ where:

$$\phi=[\sin^2(N.k_{ph}.d/2)]/[\sin^2(k_{ph}.d/2)]$$

Figure 2:
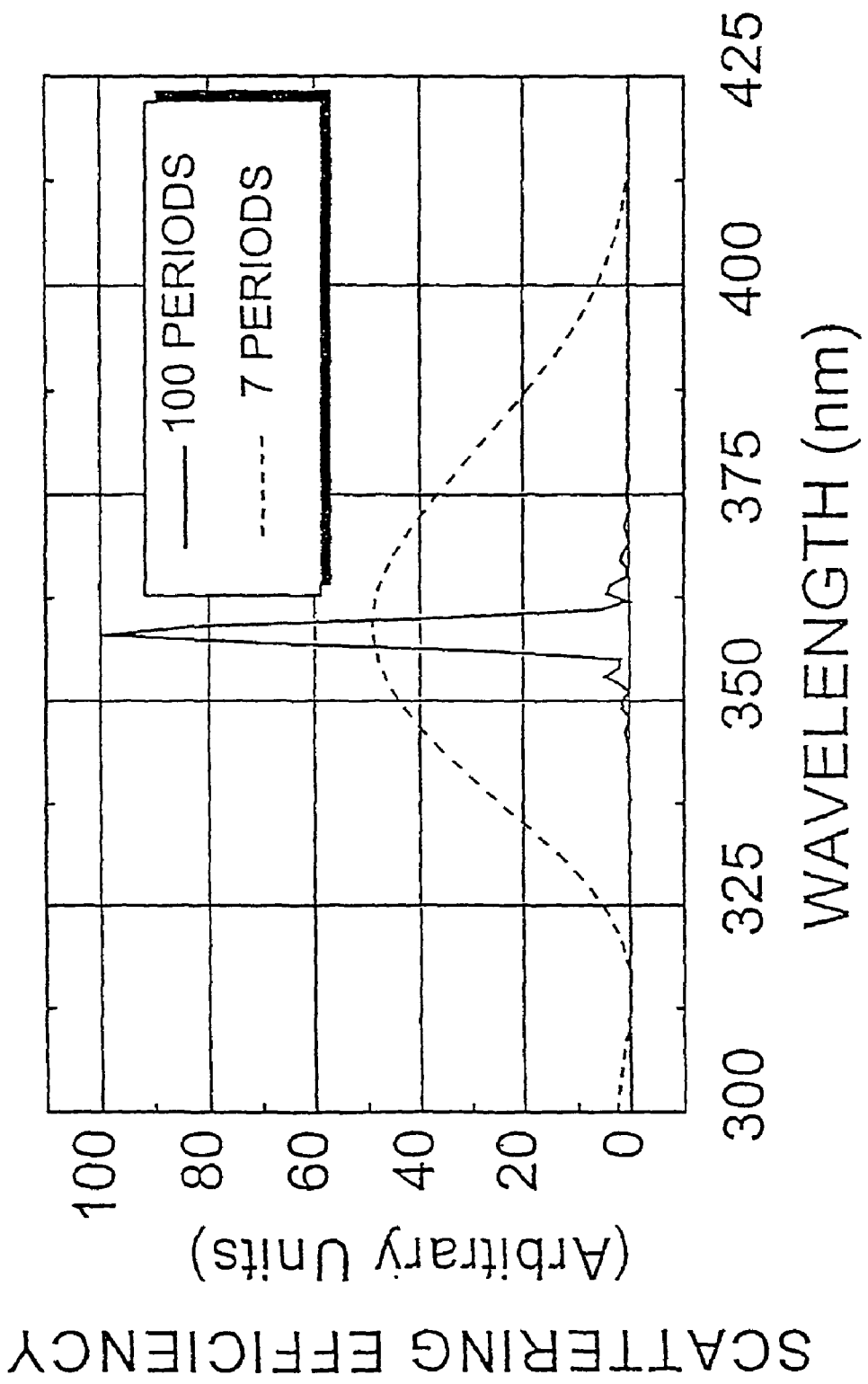
FIG. 2 shows the relative scattering efficiencies of the first (x-axis) and second (z-axis) diffraction gratings of the diffraction grating portion of an iridescent material according to the present invention
Figure 3:
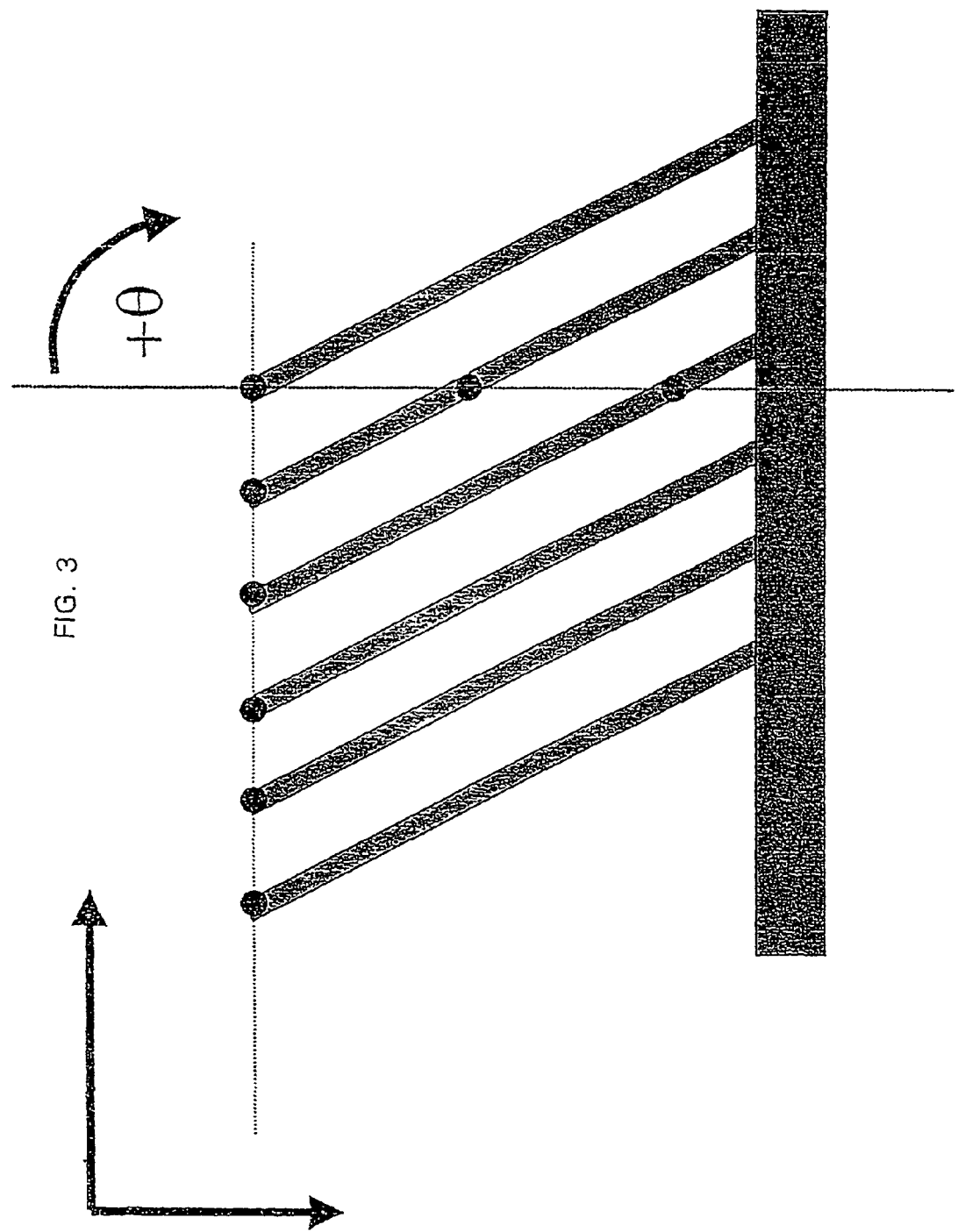
FIG. 3 shows scattering centres for the diffraction gratings of FIG. 2.

FIG. 2 compares this quantity for a seven period (z axis) grating with that for a 100 period (x axis) grating. As can be seen, the x axis grating is a much more efficient scatterer (its efficiency being divided by two orders of magnitude in the graph of FIG. 2) yet the z axis grating scatters (diffracts) a much wider range of wavelengths of light. As can be predicted from the Figure, if the x axis grating were of infinite extent, then only a single wavelength of light would be diffracted.

Referring back to FIG. 4(*b*), the momentum width of the scattering peak in FIG. 2 can be estimated from the lengths of the vectors A-to-C and D-to-F since these represent the extent to which points in the momentum space are blurred into lines by the unusual behaviour of a grating with a limited number of periods.

Thus it can be appreciated that a surface carrying an iridescent material in accordance with the present invention will exhibit different optical effects when viewed from angles close to perpendicular to the X axis than when viewed at those close to perpendicular to the Z axis. In the former case, only very few wavelengths of light will be diffracted giving a reflected image in a single colour, in the latter case a larger number of wavelengths will be diffracted reflecting a multi-coloured, iridescent hue to the viewer. The effect can be used to disguise images so that they may be viewed clearly only from certain angles.

Possible applications of this technology include the coating of private or confidential letters or documents so that they may only be viewed by the reader positioned directly in front of the document. Similarly, data on bankers or other identification cards may be disguised or made difficult to counterfeit by use of these materials as surface coatings. Other anti-counterfeiting applications may include the application of these materials to bank notes so that certain images or information are made iridescent only in certain lights.

Other applications may make use of the aesthetic qualities of the optical effects produced by these materials to create eye-catching art work or advertising materials. Similarly, attractive wrapping papers or gift cards may be produced. Where the invention is applied to fabrics, attractive clothing or soft furnishings may be produced. Other similar embodiments may occur to the skilled addressee without departing from the true scope of the invention.

The invention claimed is:

1. A document security device comprising a document onto which information can be provided and having applied to the whole or part of a surface of said document one or more iridescent materials, the one or more iridescent materials each comprising a diffraction grating incorporating a plurality of sheets of a first substantially transparent material in parallel alignment and spaced apart by quantities of a second substantially transparent material, the second material having a refractive index significantly lower than the refractive index of the first material, the sheets being tilted at an angle θ to an axis X and the grating having a period d(X) in the direction of axis X, the angle θ and period d (X) being such that a second diffraction grating is provided along an axis Z, perpendicular to axis X, the second diffraction grating having a period d (Z) and consisting of twenty five periods or less and at least five periods whereby, the diffraction conditions of the second diffraction grating can be simultaneously fulfilled by waveforms of a range of wavelengths thereby causing iridescence such that information which may be provided on the document can only be viewed clearly from a viewing point substantially perpendicular to the surface of the document.

2. A document security device as claimed in claim 1 wherein a plurality of iridescent materials are applied to the surface of the document and are arranged to form a pattern, each iridescent material causing iridescence at a different grazing angle and/or for different wavelengths of electromagnetic radiation.

3. A document security device as claimed in claim 1 wherein the materials are configured for causing iridescence for electromagnetic radiation having a wavelength in the range $10^{-3}$ m to $10^{-8}$ m.

4. A document security device as claimed in claim 1 wherein the second material of the diffraction grating is air.

5. A document security device as claimed in claim 1 wherein the first and second materials of the diffraction grating are provided in sheet form and are interleaved to form a multilayer structure.

6. A document security device as claimed in claim 1 where the number of periods is fifteen or less.

7. A document security device as claimed in claim 6 wherein the second diffraction grating consists of between 5 and 9 periods.

8. A document security device according to claim 1 wherein the document is a banker's card or an identification card.

9. A document security device according to claim 1 wherein the document is a bank note.

10. A method of making a document according to claim 1, said method comprising the step of forming an iridescent material by the steps of:
   (i) providing first and second materials in sheet form; and
   (ii) interleaving the first and second materials to form a multilayer structure.

* * * * *